US010659326B2

(12) United States Patent
Greisen et al.

(10) Patent No.: US 10,659,326 B2
(45) Date of Patent: May 19, 2020

(54) CLOUD COMPUTING NETWORK INSPECTION TECHNIQUES

(71) Applicant: Microsoft Technology Licensing, LLC, Redmond, WA (US)

(72) Inventors: Marc Victor Greisen, Seattle, WA (US); Cheick Omar Keita, Redmond, WA (US); Stanislav Tishkin, Sammamish, WA (US); Marina Polishchuk, Seattle, WA (US); Senthil Kumaran Chandran, Issaquah, WA (US); William Blum, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 126 days.

(21) Appl. No.: 15/796,586

(22) Filed: Oct. 27, 2017

(65) Prior Publication Data

US 2019/0132223 A1    May 2, 2019

(51) Int. Cl.
| | |
|---|---|
| *H04L 12/26* | (2006.01) |
| *G06Q 10/06* | (2012.01) |
| *G06F 11/34* | (2006.01) |
| *H04L 12/24* | (2006.01) |

(52) U.S. Cl.
CPC ........ *H04L 43/045* (2013.01); *G06F 11/3419* (2013.01); *G06Q 10/06* (2013.01); *H04L 41/06* (2013.01); *H04L 43/065* (2013.01); *H04L 43/14* (2013.01); *H04L 41/046* (2013.01)

(58) Field of Classification Search
CPC ..... H04L 41/046; H04L 41/06; H04L 43/045; H04L 43/065; H04L 43/14
See application file for complete search history.

(56) References Cited

U.S. PATENT DOCUMENTS

| | | | |
|---|---|---|---|
| 2012/0072968 A1* | 3/2012 | Wysopal | G06F 11/3612 726/1 |
| 2014/0089493 A1 | 3/2014 | Bauer et al. | |
| 2015/0249586 A1* | 9/2015 | Byers | H04L 43/0805 709/224 |

(Continued)

OTHER PUBLICATIONS

Aceto, et al., "Cloud Monitoring: A Survey", In Computer Networks, vol. 57, Issue 9, Jun. 1, 2013, pp. 2093-2115.

(Continued)

*Primary Examiner* — Gil H. Lee
(74) *Attorney, Agent, or Firm* — Newport IP, LLC; Mike R. Cicero

(57) ABSTRACT

A user interface (UI) may be used to introduce a message into the cloud computing network. The message may be received by a service associated with the cloud computing network. The message may trigger the service to generate data in response to receiving the message. The generated data may include temporal data that includes the date and time data specifying when the message was received by the service. The generated temporal data may be forwarded to a telemetry store associated with the cloud computing network. A user or report generating operator portal may generate a report that includes the generated temporal data. The generated report may be used to determine if the service associated with the cloud computing network is functioning properly.

20 Claims, 6 Drawing Sheets

(56) References Cited

U.S. PATENT DOCUMENTS

| | | | | |
|---|---|---|---|---|
| 2016/0127254 A1* | 5/2016 | Kumar | ................... | H04L 47/70 |
| | | | | 709/226 |
| 2016/0337474 A1* | 11/2016 | Rao | ........................ | H04L 49/25 |
| 2017/0250887 A1* | 8/2017 | Sadana | ................ | H04L 41/046 |
| 2017/0286279 A1* | 10/2017 | Allison | .............. | G06F 11/3688 |

OTHER PUBLICATIONS

Cedillo, et al., "Towards Monitoring Cloud Services Using Models@run. time", Retrieved from: <<http://ceur-ws.org/Vol-1270/mrt14_submission_5.pdf>>, Jan. 1, 2014, 11 Pages.

Herbold, et al., "The MIDAS Cloud Platform for Testing SOA Applications", In Proceedings of IEEE 8th International Conference on Software Testing, Verification and Validation, Apr. 13, 2015, 8 Pages.

Mehrotra, Nefia, "Cloud Testing vs. Testing a Cloud", In Proceedings of 10th Annual International Software Testing Conference, Aug. 2011, 8 Pages.

"International Search Report and Written Opinion Issued in PCT Application No. PCT/US2018/056815", dated Jan. 4, 2019, 15 Pages.

* cited by examiner

CLOUD COMPUTING NETWORK INSPECTION TECHNIQUES

BACKGROUND

Cloud computing refers to the practice of using a network of remote servers hosted on a public network (e.g., the Internet) to deliver information computing services (i.e., cloud services) as opposed to doing so on a local server. The network architecture (e.g., virtualized information processing environment comprising hardware and software) through which these cloud services are provided to service consumers (i.e., a cloud service consumers) is referred to as "the cloud", which can be a public cloud (e.g., cloud services provided publicly to cloud service consumers) or a private cloud (e.g., a private network or data center that supplies cloud services to only a specified group of cloud service consumers within an enterprise), or a community cloud (e.g., a set of cloud services provided publicly to a limited set of cloud service consumers, e.g., to agencies with a specific State/Region or set of States/Regions), dedicated/hosted private cloud, or other emerging cloud service delivery models. The underlying intent of cloud computing is to provide easy, scalable access to computing resources and information technology (IT) services to cloud service consumers.

Cloud computing provides access to a wide range of services. These services range from processing, server, storage, network, applications and online services. These services allow cloud consumers to rapidly provision, manage and release resources on demand with little management effort and without service provider interaction. Providers may advertise a set of services as a package bundle-often referred to as "plans" or "offers." Cloud consumers can subscribe to these package bundles to get a system-wide entity called a subscription that provides consumer access to all advertised services. Once a subscription is acquired, then the consumers can create resources using these different services.

A cloud computing infrastructure may include a set of services registered by a service provider during initial setup. The set of services gets up-dated (e.g., added and removed) over time. These cloud infrastructure services are of different types ranging from services required to monitor, run and manage cloud infrastructure (often called "system services") to services directly used by the cloud consumers to create their own resources (often called "resource providers"). There may be a central service that manages all of these registered services.

There may be scenarios in which one or more cloud service experiences operational difficulty because of software, hardware or network failures. If one or more system service fails, then cloud system functionality is impacted, and the cloud system may be unusable to accomplish tasks supported by the malfunctioning one or more system service. If the central service fails, the entire cloud system may fail to respond to cloud consumer requests and/or may become unavailable.

It is with respect to these considerations and others that the disclosure made herein is presented.

SUMMARY

This disclosure describes cloud computing network inspection techniques that may be used to determine if one or more services associated with a cloud computing network are properly functioning. In some implementations, a user interface (UI) is used to introduce a message into the cloud computing network. The message may be received by a service associated with the cloud computing network. The service associated with the cloud computing network may be a front-end web service or portal, a provisioning service, and/or an orchestrator service. The message may trigger the service to generate data in response to receiving the message. The generated data may include temporal data that includes the date and time data specifying when the message was received by the service. The generated temporal data may be forwarded to a telemetry store associated with the cloud computing network. A user or report generating operator portal may generate a report that includes the generated temporal data. The generated report may be used to determine if the service associated with the cloud computing network is functioning properly.

In some implementations, a system for cloud computing network inspection is provided. The system may include at least one processor; and at least one memory in communication with the at least one processor, the at least one memory having computer readable instructions stored thereupon that, when executed by the at least one processor, cause the at least one processor to: receive a message at a first cloud service associated with a cloud computing network, generate data at the first cloud service in response to receiving the message, the generated data including temporal data related to the received message, communicate the generated data to a telemetry store, and generate a report at the telemetry store that includes at least the temporal data related to the received message.

In other implementations, a computer-readable storage medium having computer-executable instructions stored thereupon is provided. When the computer-executable are executed by one or more processors of a computing device, the instructions cause the one or more processors of the computing device to: receive a message at a first cloud service associated with a cloud computing network; generate data at the first cloud service in response to receiving the message, the generated data including temporal data related to the received message; communicate the generated data to a telemetry store; and generate a report at the telemetry store that includes at least the temporal data related to the received message.

In some implementations, a computer implemented method for inspecting elements of a cloud computing network is provided. The method may include: receiving a message at a first cloud service associated with the cloud computing network; generating data at the first cloud service in response to receiving the message, the generated data including temporal data related to the received message; communicating the generated data to a telemetry store; and generating a report at the telemetry store that includes at least the temporal data related to the received message.

It should be appreciated that, although described in relation to a system, the above-described subject matter may also be implemented as a computer-controlled apparatus, a computer process, a computing system, or as an article of manufacture such as a computer-readable medium and/or dedicated chipset. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
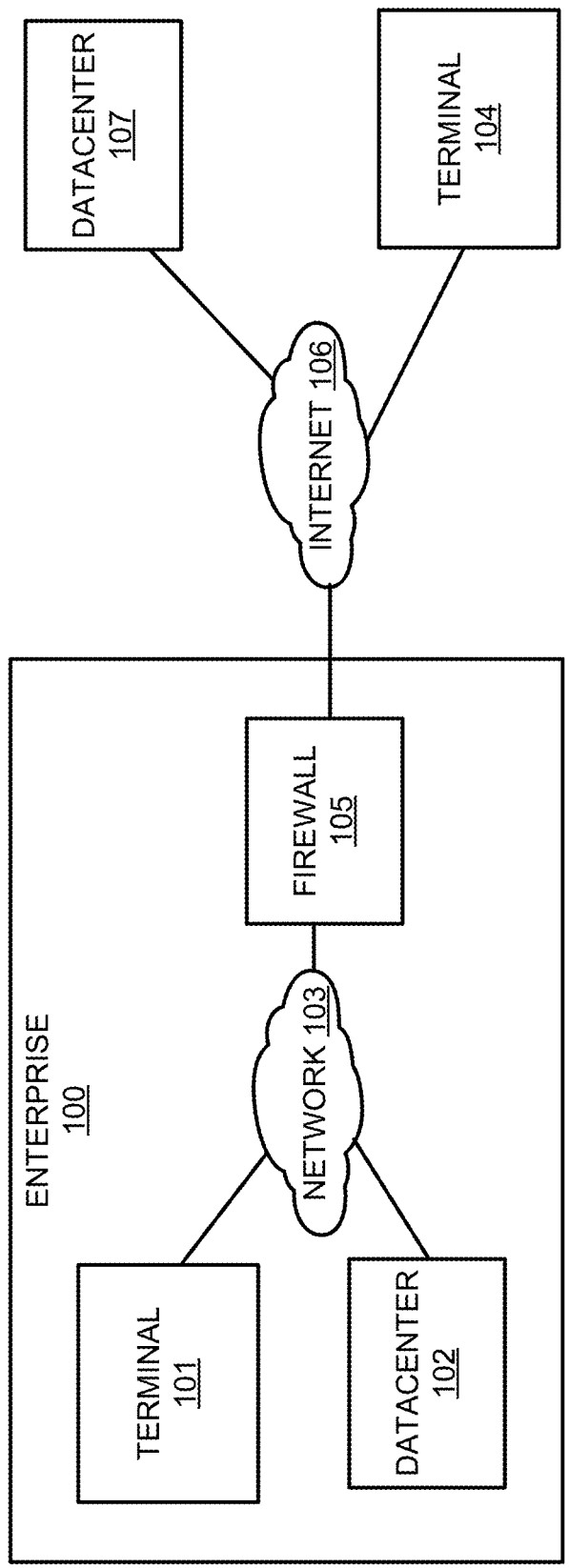
FIG. 1 illustrates a high-level block diagram of a system that provides users with access to local, on premises resources and to remote or public resources.

This disclosure describes cloud computing network inspection techniques that may be used to determine if one or more services associated with a cloud computing network are properly functioning. In some implementations, a user interface (UI) is used to introduce a message into the cloud computing network. The message may be received by a service associated with the cloud computing network. The service associated with the cloud computing network may be a front-end web service or portal, a provisioning service, and/or an orchestrator service. The message may trigger the service to generate data in response to receiving the message. The generated data may include temporal data that includes the date and time data specifying when the message was received by the service. The generated temporal data may be forwarded to a telemetry store associated with the cloud computing network. A user or report generating operator portal may generate a report that includes the generated temporal data. The generated report may be used to determine if the service associated with the cloud computing network is functioning properly.

In some implementations, a system for cloud computing network inspection is provided. The system may include at least one processor; and at least one memory in communication with the at least one processor, the at least one memory having computer readable instructions stored thereupon that, when executed by the at least one processor, cause the at least one processor to: receive a message at a first cloud service associated with a cloud computing network, generate data at the first cloud service in response to receiving the message, the generated data including temporal data related to the received message, communicate the generated data to a telemetry store, and generate a report at the telemetry store that includes at least the temporal data related to the received message.

In other implementations, a computer-readable storage medium having computer-executable instructions stored thereupon is provided. When the computer-executable are executed by one or more processors of a computing device, the instructions cause the one or more processors of the computing device to: receive a message at a first cloud service associated with a cloud computing network; generate data at the first cloud service in response to receiving the message, the generated data including temporal data related to the received message; communicate the generated data to a telemetry store; and generate a report at the telemetry store that includes at least the temporal data related to the received message.

In some implementations, a computer implemented method for inspecting elements of a cloud computing network is provided. The method may include: receiving a message at a first cloud service associated with the cloud computing network; generating data at the first cloud service in response to receiving the message, the generated data including temporal data related to the received message; communicating the generated data to a telemetry store; and generating a report at the telemetry store that includes at least the temporal data related to the received message.

FIG. 1 illustrates a high-level block diagram of a system that provides users with access to local, on premises resources and to remote or public resources. A local enterprise terminal 101 allows users to directly access an on-premises datacenter (private cloud) 102 via an on-premises network 103. Users located outside enterprise 100 may access the on-premises datacenter 102 using a remote terminal 104. The terminals 101 and 104 may be, for example, a desktop, laptop, notebook, or tablet computer. Other devices, such as dedicated terminals, smartphones, personal digital assistants (PDA), etc. may also be used as the terminals 101 and 104.

A firewall 105 provides network security system for the enterprise 100 and controls incoming and out all going network traffic. The external terminal 104 may connect to the enterprise on premises network 103 via the Internet 106 or any public or private network. The firewall 105 allows terminal 104 to access the on-premises datacenter 102 if the terminal 104 provides the appropriate credentials and authentication. Enterprise users at the terminals 101 and 104 may also access a public datacenter (public cloud) 107 via the Internet 106.

The on premises datacenter 102 and the public datacenter 107 may provide "cloud computing" services to the enterprise 100 and other users. By freeing enterprise users from managing information technology (IT) infrastructure, cloud computing provides virtually limitless compute, storage, and network resources at low cost, while allowing services to scale on demand.

Figure 2:
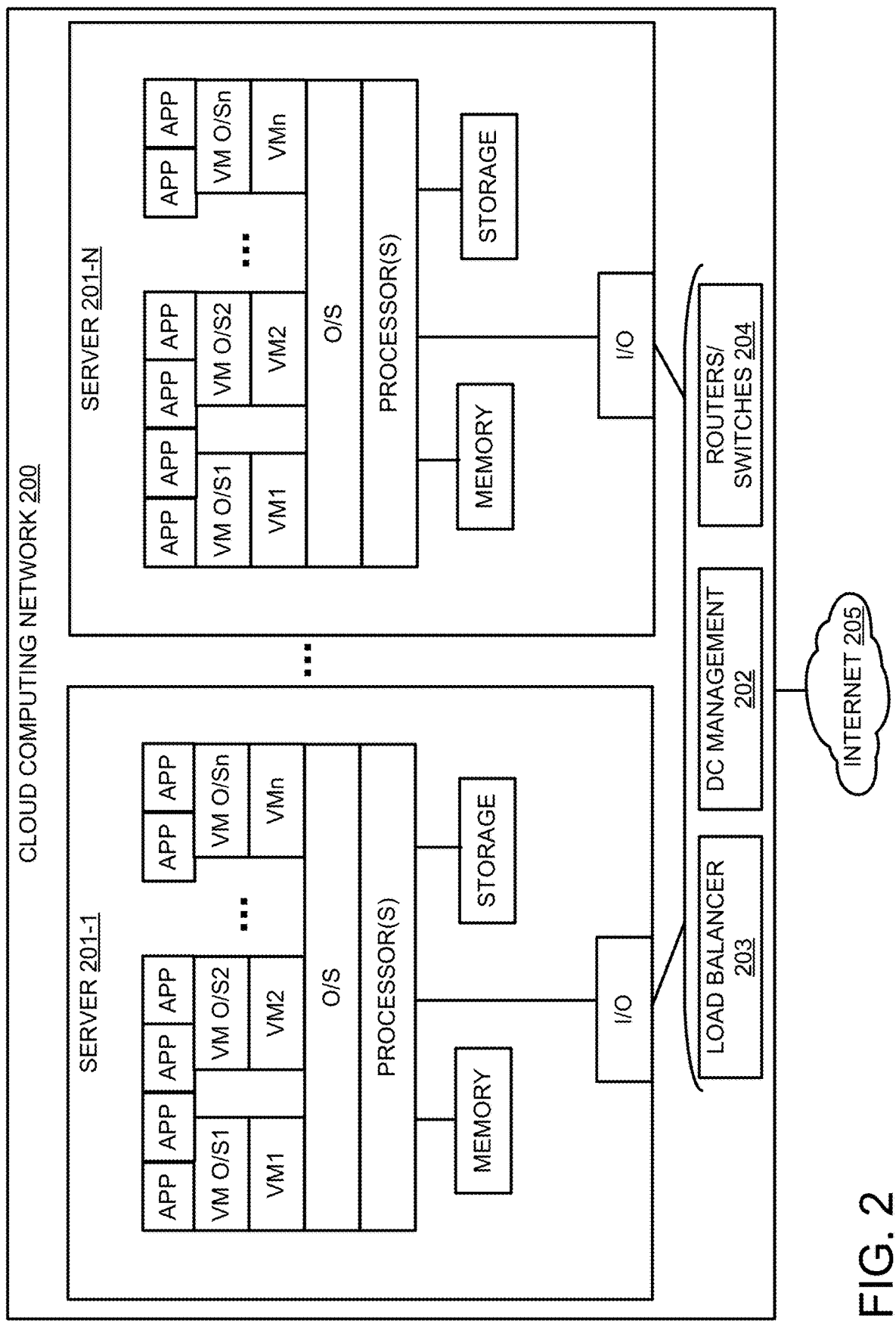
FIG. 2 illustrates a block diagram of a distributed computing network that provides cloud computing services or distributed computing services according to at least one exemplary implementation.

FIG. 2 illustrates a block diagram of a cloud computing network 200 that provides cloud computing services or distributed computing services according to at least one exemplary implementation. A plurality of servers 201 may be managed by datacenter management controller 202. A load balancer 203 may distribute requests and workloads over the servers 201 to avoid a situation where a single server 201 becomes overwhelmed and to maximize available capacity and performance of the resources in the datacenter 200. Routers/switches 204 may support data traffic between the servers 201 and between the computing network 200 and external resources and users via a network 205, such as the Internet or a local area network (LAN). The computing network 200 may comprise the on-premises datacenter 102 or the public datacenter 107.

The servers 201 may be traditional standalone computing devices and/or they may be configured as individual blades in a rack of many server devices. The servers 201 may have an input/output (I/O) connector that manages communication with other database entities. One or more host processors on each server 201 may run a host operating system (O/S) that supports multiple virtual machines (VM). Each VM may run its own O/S so that each VM O/S on a server is different, or the same, or a mix of both. The VM O/S's may be, for example, different versions of the same O/S (e.g., different VMs running different current and legacy versions of the Microsoft Windows® operating system). In addition, or alternatively, the VM O/S's may be provided by different manufacturers (e.g., some VMs running the Microsoft Windows® operating system, while others VMs run the Linux® operating system). Each VM may then run one or more applications (App). Each server also includes storage (e.g., hard disk drives (HDD)) and memory (e.g., RAM) that can be accessed and used by the host processors and VMs.

Cloud computing is the delivery of computing capabilities as a service, making access to IT resources like computing power, networking and storage quickly and readily available. By tapping into cloud services, users can harness the power of massive data centers without having to build, manage or maintain costly, complex IT building blocks. With the cloud, much of the complexity of IT is abstracted away, letting enterprise entities and individuals focus just on the infrastructure, data and application development.

The cloud computing network 200 provides pooled resources on which customers or tenants can dynamically provision and scale applications as needed without having to add more servers or additional networking. This allows tenants to obtain the computing resources they need without having to procure, provision, and manage infrastructure on a per-application, ad-hoc basis.

The cloud computing network 200 further allows tenants to scale up or scale down resources dynamically to meet the current needs of their business. Additionally, a datacenter operator can provide usage-based services to tenants so that they pay for only the resources they use, when they need to use them. For example, a tenant may initially use one VM on server 201-1 to run their applications. When demand increases, the cloud computing network 200 may activate additional VMs on the same server and/or on a new server 201-N as needed. These additional VMs can be deactivated if demand later drops.

The cloud computing network 200 may offer guaranteed availability, disaster recovery, and back-up services. For example, the datacenter may designate one VM on server 201-1 as the primary location for the tenant's application and may activate a second VM on the same or different server as a standby or back-up in case the first VM or server 201-1 fails. The database manager 202 may automatically shift incoming user requests from the primary VM to the back-up VM without requiring tenant intervention. Although cloud computing network 200 is illustrated as a single location, it will be understood that servers 201 may be distributed to multiple locations across the globe to provide additional redundancy and disaster recovery capabilities.

The cloud computing network 200 may offer different levels of cloud computing services to tenants. With an Infrastructure-as-a-Service (IaaS) offering, the lower levels of the IT stack are delivered as a service, which frees up developers from much of the complexity of provisioning physical machines and configuring networks. With IaaS, tenants can easily provision virtual machines in a highly scalable and available cloud environment, develop and test solutions, then deploy applications to production. With a Platform-as-a-Service (PaaS) offering, everything from network connectivity through the runtime is provided. PaaS makes development easy by providing additional support for application services and management of the operating system, including updates. With PaaS, tenants can focus on the business logic of application and quickly move applications from concept to launch. With a Software-as-a-Service (SaaS) offering, a single finished application or suite of applications can be delivered to customers through a web browser, thereby eliminating their need to manage the underlying components of the IT stack including application code.

Referring again to FIG. 1, an enterprise may use a public datacenter or public cloud computing services to take advantage of cost savings, reduced management requirements, or particular services offered. On the other hand, the enterprise may also use an on-premises datacenter or private cloud services to ensure data security or to use a proprietary application, for example. It will be understood that an enterprise does not have to use an on-premises datacenter to take advantage of private cloud services. Instead, private cloud services may be provided by a datacenter that limits access to the enterprise.

Figure 3:
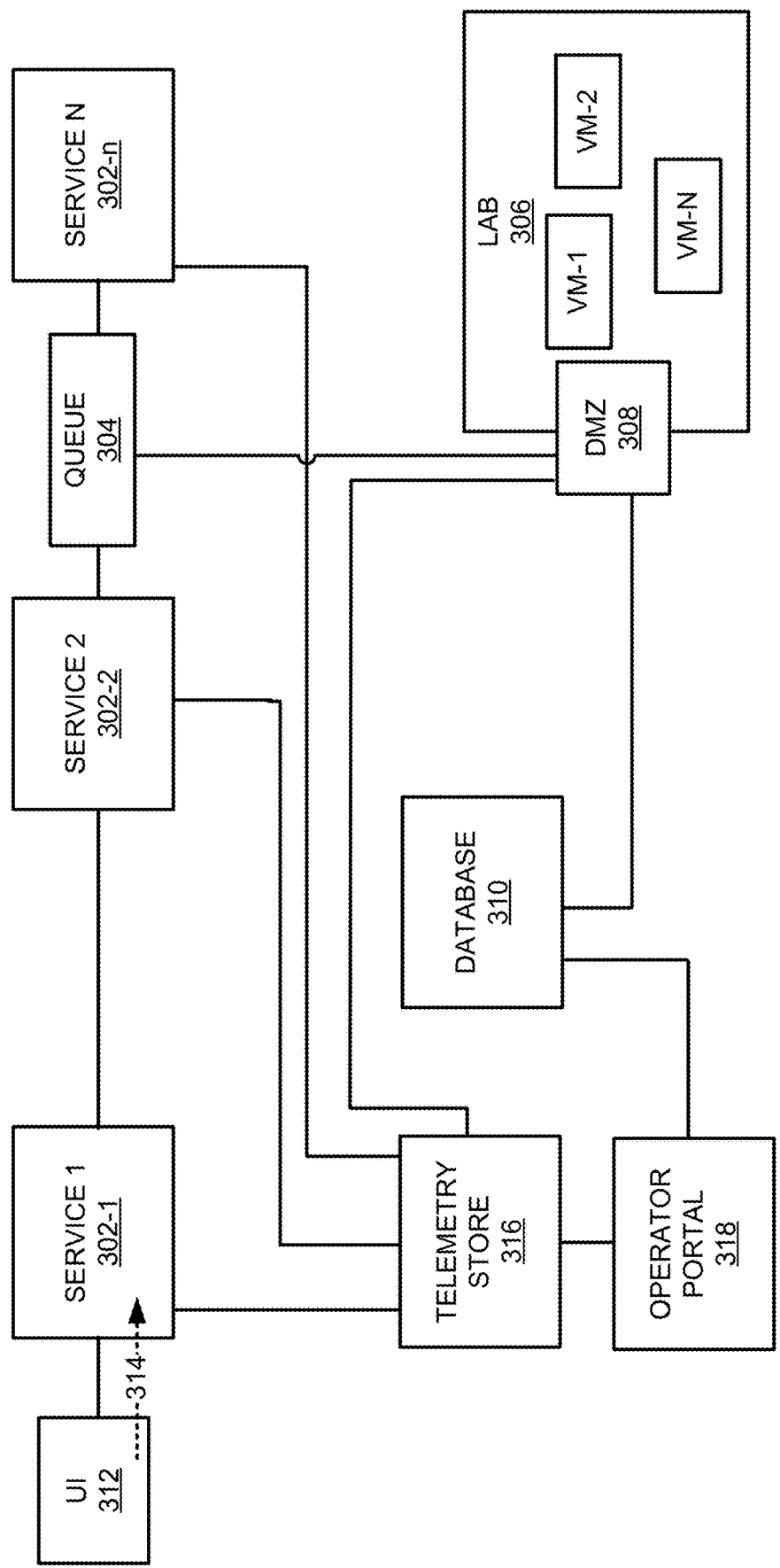
FIG. 3 illustrates an exemplary cloud computing arrangement that may be implemented by a cloud computing infrastructure.

FIG. 3 illustrates an exemplary cloud computing arrangement 300 that may be implemented by the cloud computing infrastructure illustrated in FIG. 1 and/or FIG. 2. The cloud computing arrangement 300 may include a plurality of services 302-1, 302-2 and 302-n. Each of the plurality of services 302-1, 302-2 and 302-n may provide operational functionality within the cloud computing arrangement 300. For example, a first of the services 302-1 may be a front-end web service or portal used to manage customer accounts, create jobs that will run on the front-end web service, and/or view results of ongoing jobs or completed jobs. In some implementations, a second of the services 302-2 may be a provisioning service that provides, in some implementations, dynamic procurement of computing resources and other resources that are utilized to perform tasks within the cloud computing arrangement 300. Furthermore, in some implementations, a third of the services 302-n may be an orchestrator service. The orchestrator service may instantiate, organize, direct and/or integrate underlying software sub-systems for managing various aspects of interconnection within the cloud computing arrangement 300 as well as management of cloud services. The orchestrator service may, for example, provide a rule driven workflow engine that operates between application programming interfaces (API) and the underlying interconnect platform of cloud computing arrangement 300 that includes sub-systems and network infrastructure. In this way, the orchestrator service can be used by customer applications and APIs for direct participation with the interconnection platform of the cloud computing arrangement 300. In other words, such an orchestrator service offers a cloud platform service having various application engines or workflows to handle requests associated with the cloud computing arrangement 300.

The cloud computing arrangement 300 may further include a queue 304. The queue 304 is illustrated as being disposed between two of the services 302-1, 302-2 and 302-n. The queue 304 is functional to handle communication between a plurality of the services 302-1, 302-2 and 302-n and a test lab 306. Specifically, the queue 304 is coupled to the test lab 304 via a DMZ interface 308. In some implementations, the queue 304 is a cloud service, similar to the services 302-1, 302-2 and 302-n. Additionally, the cloud computing arrangement 300 may include a database 310. The database 310 may store fuzz testing results generated by the lab 306. Specifically, the lab 306 may include one or more VM-1, VM-2 and VM-N usable in verifying that a program behaves as expected as events from uncorrelated sources occur. The VM-1, VM-2 and VM-N are used for fuzz testing, or fuzzing, which involves using the one or more VM-1, VM-2 and VM-N to generate events from outside of an application under test, and verifying whether the application under test responds as specified. The application under test may be linked to one of the services 302-1, 302-2 and 302-n. There may be plurality of labs 306 to support fuzzing a plurality of applications under test spanning a plurality of the services 302-1, 302-2 and 302-n. Fuzz testing can provide much broader coverage for a given amount of effort and is especially favored when budgets and/or time are short.

There may be scenarios in which one or more of the cloud services 302-1, 302-2 and 302-n and/or the queue 304 experiences operational difficulty because of software, hardware and/or network failures. If one or more of the cloud services 302-1, 302-2 and 302-n and/or the queue 304 fails, then functionality associated with the cloud computing arrangement 300 may be impacted, and the cloud computing arrangement 300 may be unusable to accomplish tasks supported by the malfunctioning one or more services 302-1, 302-2 and 302-n and/or queue 304. At least some of the implementations described herein provide techniques to inspect the services 302-1, 302-2 and 302-n, queue 304 and infrastructure of the cloud computing arrangement 300 to ascertain a current functional status thereof.

The cloud computing arrangement 300 may include a user interface (UI) 312 coupled to one or more of the services 302. The UI 312 may be used to insert a message 314 into the infrastructure of the cloud computing arrangement 300. The message 314 may have an associated unique identification and message type. The message 314 is designed to cause one or more the services 302-1, 302-2 and 302-n, the queue 304 and/or the lab 306 to generate data upon receiving and processing the message 314.

In some implementations, the message 314 has a message type that causes the receiving service (e.g., one or more the services 302-1, 302-2 and 302-n or queue 304) to generate date and/or time information (e.g., temporal data) related to when the message 314 was received by the receiving service. Furthermore, in some implementations, the message 314 may have a message type that causes the receiving entity to generate data, such as date and time information related to when the message 314 is forwarded to a destination entity (e.g., one or more the services 302-1, 302-2 and 302-n or queue 304).

The data, such as the generated date and time information, may be communicated to and stored in a telemetry store 316. In some implementations, the UI 312 may be operated by a user to cause the generation and communication of messages 314. In other implementations, the UI 312 may be operated by a user to cause the generation and communication of messages 314 over a predefined duration or a predefined number of messages 314.

The telemetry store 316 may be accessed by an operator portal 318. The operator portal 318 may be used to generate a report that includes the data generated by one or more of the services 302 and/or the queue 304. In some implementations, the report may provide information including: (1) the services 302-1, 302-2 and 302-n, queue 304 and/or lab 306 that provided data; (2) the unique identification and message type associated with the message 314 that caused the generation of the data by the services 302-1, 302-2 and 302-n, queue 304 and/or lab 306; (3) the message type; (4) the date and time that the services 302-1, 302-2 and 302-n, queue 304 and/or lab 306 received the message 314; and/or (5) the date and time that the service forwarded the message 314 to another entity within the cloud computing arrangement 300.

Furthermore, in some implementations, the generated report may include fuzz testing results stored in the database 310. Accordingly, the use of one or more messages 314 enables the generation of a report that indicates if the services 302-1, 302-2 and 302-n, queue 304 and/or lab 306 are functioning properly within the cloud computing arrangement 300.

Figure 4:
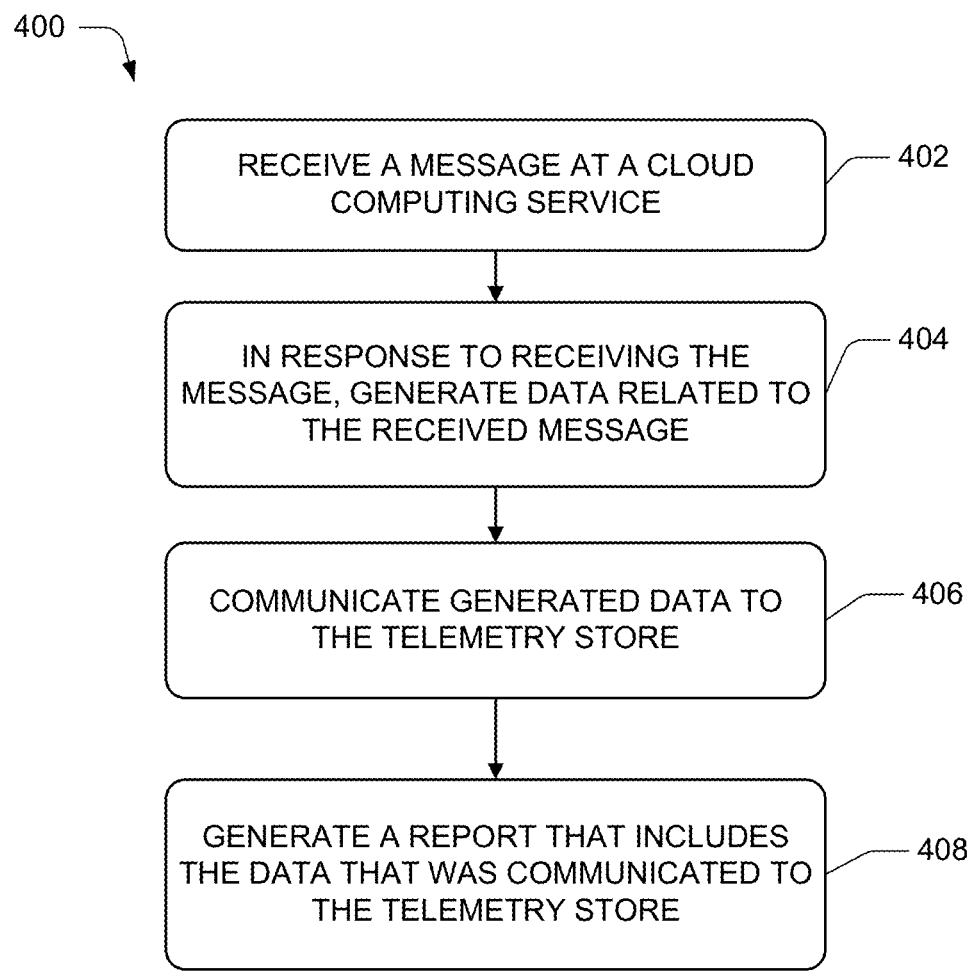
FIG. 4 illustrates exemplary aspects of a routine related to the cloud computing network inspection techniques.

Turning now to FIG. 4, aspects of a routine 400 related to the cloud computing network inspection techniques are described. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims. Furthermore, it is to be understood that the routine 400 may be implemented by one or more of the elements illustrated in FIGS. 1-3 and FIGS. 5-6 and the related description of those figures.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 400 are described herein as being implemented, at least in part, by an application, component and/or circuit, such as the data center 107 and/or data center 102 and associated with the enterprise 100. Furthermore, the operations of the routine 400 are described herein as being possibly implemented, at least in part, by an application, component and/or circuit, such as the cloud computing network 200 and/or the cloud computing arrangement 300. Additionally, although the following illustration may refer to the components or elements of FIGS. 1-3 and FIGS. 5-6, it can be appreciated that the operations of the routine 400 may also be implemented in many other ways. In addition, one or more of the operations of the routine 400 may alternatively or additionally be implemented, at least in part, by a chipset working alone or in conjunction with other software modules. Any service, circuit or application suitable for providing the techniques disclosed herein can be used in operations described herein.

At block 402, a cloud computing service, such as one of the services 302-1, 302-2, 302-n and/or queue 304, receives a message. The message may be automatically generated through the UI 312, or the message may be generated by a user of the UI 312.

At block 404, in response to receiving the message, the cloud computing service that receive the message generates data related to the received message. In some implementations, the generated data includes temporal data related to the received message. In some implementations, the temporal data includes at least a date and time that the message was received by the cloud computing service.

At block 406, the generated data is communicated to a storage, such as the telemetry store 316. In some implementations, the generated data is communicated to the storage by way of the cloud computing service that received the message.

At block 408, a report is generated that includes the data that was communicated to the storage. In some implementations, the report is generated by the telemetry store 316. Furthermore, in some implementations, the generated report includes: (1) the cloud computing service that provided data; (2) the unique identification and message type associated with the message that caused the generation of the data by the cloud computing service; (3) the message type; (4) the date and time that the cloud computing service received the message; and/or (5) the date and time that the service forwarded the message to another entity within the cloud computing arrangement 300. Furthermore, in some implementations, the generated report may include fuzz testing results stored in a database, such as the database 310. Accordingly, the use of one or more messages 314 enables the generation of a report that indicates if the cloud computing services, queue, such as the queue 304 and/or a fuzz testing lab, such as the lab 306 are functioning properly within the cloud computing arrangement.

Figure 5:
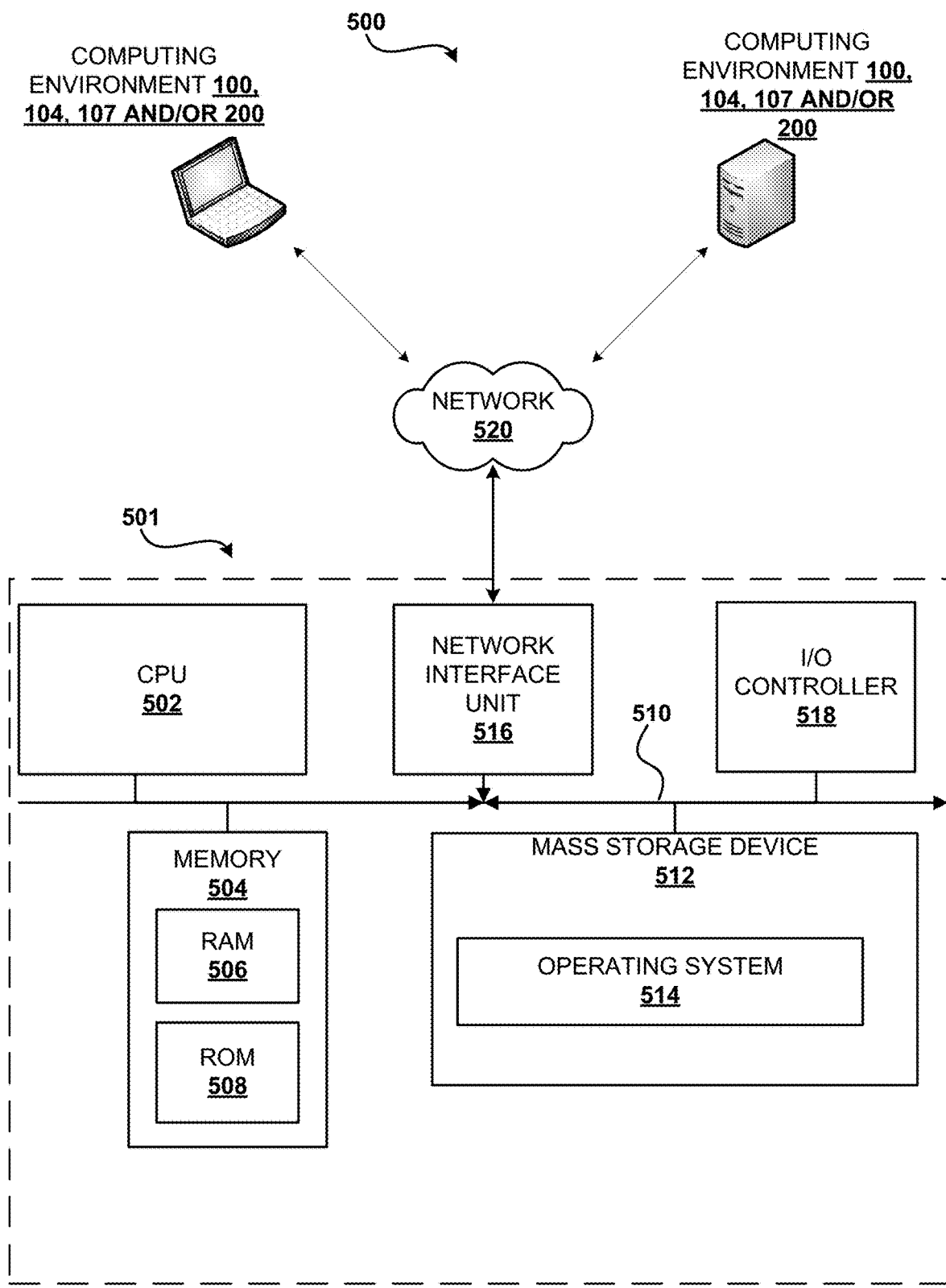
FIG. 5 shows additional details of an illustrative computer architecture for a computer capable of executing the herein described methods.

The computer architecture 500 illustrated in FIG. 5 includes a central processing unit 502 (processor or CPU), a system memory 504, including a random-access memory 506 (RAM) and a read-only memory (ROM) 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing an operating system 514, other data, and one or more application programs.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes of the claims, the phrase "computer storage medium," "computer-readable storage medium" and variations thereof, does not include waves, signals, and/or other transitory and/or intangible communication media, per se.

According to various techniques, the computer architecture 500 may operate in a networked environment using logical connections to remote computers or computing environment(s) 100, 104, 107 and/or 200 through a network 520 and/or another network (not shown). For example, the network 512 may be the network 103, 106, and/or network 205, The computer architecture 500 may connect to the network 520 through a network interface unit 516 connected to the bus 510. It should be appreciated that the network interface unit 516 also may be utilized to connect to other types of networks and remote computer systems. The computer architecture 500 also may include an input/output controller 518 for receiving and processing input from a number of other devices, including a keyboard, mouse, or electronic stylus (not shown in FIG. 5). Similarly, the input/output controller 518 may provide output to a display screen, a printer, or other type of output device (also not shown in FIG. 5). It should also be appreciated that via a connection to the network 520 through a network interface unit 516, the computing architecture may enable the client computing environment 501 to communicate with the computing environments 100, 104, 107 and/or 200.

It should be appreciated that the software components described herein may, when loaded into the CPU 502 and executed thereby, transform the CPU 502 and the overall computer architecture 500 from a general-purpose computing system into a special-purpose computing system customized to facilitate the functionality presented herein. The CPU 502 may be constructed from any number of transistors or other discrete circuit elements and/or chipset, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Computing system 500, described above, can be deployed as part of a computer network. In general, the above description for computing environments applies to both server computers and client computers deployed in a network environment.

Figure 6:
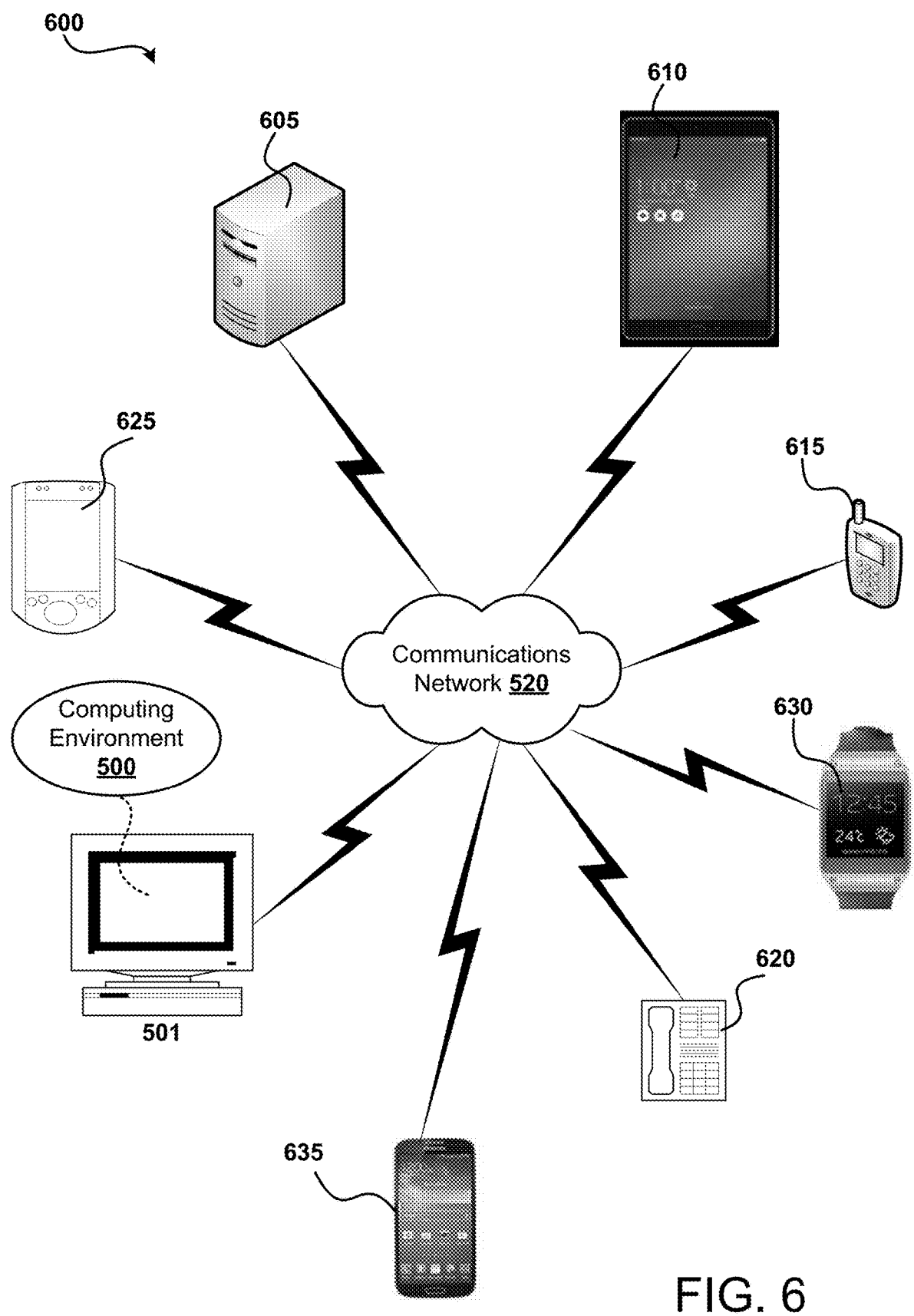
FIG. 6 shows additional details of illustrative computing devices cooperating in accordance with the herein described systems and methods.

FIG. 6 illustrates an exemplary illustrative networked computing environment 600, with a server in communication with client computers via a communications network, in which the herein described apparatus and methods may be employed. As shown in FIG. 6, server(s) 605 may be interconnected via a communications network 520 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing environments such as a tablet personal computer 610, a mobile telephone 615, a telephone 620, a personal computer(s), a personal digital assistant 625, a smart phone watch/personal goal tracker (e.g., Apple Watch, Samsung, FitBit, etc.) 630, and a smart phone 635. In a network environment in which the communications network 520 is the Internet, for example, server(s) 605 can be dedicated computing environment servers operable to process and communicate data to and from client computing environments 501, 610, 615, 620, 625, 630, and 635 via any of a number of known protocols, such as, hypertext transfer protocol (HTTP), file transfer protocol (FTP), simple object access protocol (SOAP), or wireless application protocol (WAP). Additionally, the networked computing environment 600 can utilize various data security protocols such as secured socket layer (SSL) or pretty good privacy (PGP). Each of the client computing environments 501, 510, 515, 520, 525, 530, and 535 can be equipped with computing environment 505 operable to support one or more computing applications or terminal sessions such as a web browser (not shown), or other graphical user interface (not shown), or a mobile desktop environment (not shown) to gain access to the server computing environment(s) 605.

Server(s) 605 may be communicatively coupled to other computing environments (not shown) and receive data regarding the participating user's interactions/resource network. In an illustrative operation, a user (not shown) may interact with a computing application running on a client computing environment(s) to obtain desired data and/or computing applications. The data and/or computing applications may be stored on server computing environment(s) 605 and communicated to cooperating users through client computing environments 601, 610, 615, 620, 625, 630, and 635, over an exemplary communications network 520. A participating user (not shown) may request access to specific data and applications housed in whole or in part on server computing environment(s) 605. These data may be communicated between client computing environments 501, 610, 615, 620, 625, 630, 635 and server computing environment(s) 605 for processing and storage. Server computing environment(s) 605 may host computing applications, processes and applets for the generation, authentication, encryption, and communication of data and applications and may cooperate with other server computing environments (not shown), third party service providers (not shown), network attached storage (NAS) and storage area networks (SAN) to realize application/data transactions.

Example Clauses

The disclosure presented herein may be considered in view of the following clauses.

Example clause A, a system for cloud computing network inspection, the system comprising: at least one processor; and at least one memory in communication with the at least one processor, the at least one memory having computer readable instructions stored thereupon that, when executed by the at least one processor, cause the at least one processor to: receive a message at a first cloud service associated with a cloud computing network; generate data at the first cloud service in response to receiving the message, the generated data including temporal data related to the received message; communicate the generated data to a telemetry store; and generate a report at the telemetry store that includes at least the temporal data related to the received message.

Example clause B, the system according to clause A, wherein the temporal data related to the received message includes at least a date and time that the message was received by the first cloud service.

Example clause C, the system according to clause A, wherein the at least one processor is further caused to communicate the message to a second cloud service associated with the cloud computing network, receive the message at the second cloud service associated with the cloud computing network; generate additional data at the second cloud service in response to receiving the message, the additional data including additional temporal data related to the received message; communicate the additional data to the telemetry store; and associate the additional data with the report.

Example clause D, the system according to clause C, wherein the temporal data related to the received message includes at least a date and time the message was received by the first cloud service and the additional temporal data includes at least a date and time the message was received by the second cloud service.

Example clause E, the system according clause A, wherein the at least one processor is further caused to communicate the message to a lab service associated with the cloud computing network, receive the message at the lab service associated with the cloud computing network; generate additional data at the lab service in response to receiving the message, the generated additional data including test data; communicate the additional data to the telemetry store; and associate the additional data with the report.

Example clause F, the system according to clause E, wherein the temporal data related to the received message includes at least a date and time the message was received by the first cloud service and the test data includes fuzzing test data generated by one or more virtual machines operating in the lab service.

Example clause G, the system according to clause D, wherein the first cloud service is a front-end web service or portal used to manage customer accounts associated with the cloud computing network, and the second cloud service is a provisioning service to provide procurement of computing resources and other resources associated with the cloud computing network.

Example clause H, a computer-readable storage medium having computer-executable instructions stored thereupon which, when executed by one or more processors of a computing device, cause the one or more processors of the computing device to: receive a message at a first cloud service associated with a cloud computing network; generate data at the first cloud service in response to receiving the message, the generated data including temporal data related to the received message; communicate the generated data to a telemetry store; and generate a report at the telemetry store that includes at least the temporal data related to the received message.

Example clause I, the computer-readable storage medium according to clause H, wherein the temporal data related to the received message includes at least a date and time that the message was received by the first cloud service.

Example clause J, the computer-readable storage medium according to clause H, wherein the at least one processor is further caused to communicate the message to a second cloud service associated with the cloud computing network, receive the message at the second cloud service associated with the cloud computing network; generate additional data at the second cloud service in response to receiving the message, the additional data including additional temporal data related to the received message; communicate the additional data to the telemetry store; and associate the additional data with the report.

Example clause K, the computer-readable storage medium according to clause J, wherein the temporal data related to the received message includes at least a date and time the message was received by the first cloud service and the additional temporal data includes at least a date and time the message was received by the second cloud service.

Example clause L, the computer-readable storage medium according to clause H, wherein the at least one processor is further caused to communicate the message to a lab service associated with the cloud computing network, receive the message at the lab service associated with the cloud computing network; generate additional data at the lab service in response to receiving the message, the generated additional data including test data; communicate the additional data to the telemetry store; and associate the additional data with the report.

Example clause M, the computer-readable storage medium according to clause L, wherein the temporal data related to the received message includes at least a date and time the message was received by the first cloud service and the test data includes fuzzing test data generated by one or more virtual machines operating in the lab service.

Example clause N, the computer-readable storage medium according to clause J, wherein the first cloud service is a front-end web service or portal used to manage customer accounts associated with the cloud computing network, and the second cloud service is a provisioning service to provide procurement of computing resources and other resources associated with the cloud computing network.

Example clause O, a computer implemented method for inspecting elements of a cloud computing network, the method comprising: receiving a message at a first cloud service associated with the cloud computing network; generating data at the first cloud service in response to receiving the message, the generated data including temporal data related to the received message; communicating the generated data to a telemetry store; and generating a report at the telemetry store that includes at least the temporal data related to the received message.

Example clause P, the computer implemented method for inspecting elements of a cloud computing network according to clause O, wherein the temporal data related to the received message includes at least a date and time that the message was received by the first cloud service.

Example clause Q, the computer implemented method for inspecting elements of a cloud computing network according to clause O, comprising receiving the message at the second cloud service associated with the cloud computing network; generating additional data at the second cloud service in response to receiving the message, the additional data including additional temporal data related to the received message; communicating the additional data to the telemetry store; and associating the additional data with the report.

Example clause R, the computer implemented method for inspecting elements of a cloud computing network according to clause Q, wherein the temporal data related to the received message includes at least a date and time the message was received by the first cloud service and the additional temporal data includes at least a date and time the message was received by the second cloud service.

Example clause S, the computer implemented method for inspecting elements of a cloud computing network according to clause O, comprising communicating the message to a lab service associated with the cloud computing network, receiving the message at the lab service associated with the cloud computing network; generating additional data at the lab service in response to receiving the message, the generated additional data including test data; communicating the additional generated data to the telemetry store; and associate the additional generated data with the report.

Example clause T, the computer implemented method for inspecting elements of a cloud computing network according to clause S, wherein the temporal data related to the received message includes at least a date and time the message was received by the first cloud service and the test data includes fuzzing test data generated by one or more virtual machines operating in the lab service.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A system for cloud computing network inspection, the system comprising:
   at least one processor; and
   at least one memory in communication with the at least one processor, the at least one memory having computer readable instructions stored thereupon that, when executed by the at least one processor, cause the system to:
   receive a message, which is generated based on user input received via a user interface (UI), at a first computing service associated with a cloud computing network, the first computing service being an orchestrator service deployed in the cloud computing network to manage connectivity with an interconnect platform of the cloud computing network;
   responsive to receiving the message at the first computing service and the message having a predetermined message type, cause the first computing service to generate temporal data and to forward at least some aspects of the message to a second computing service associated with the cloud computing network, the second computing service being a provisioning service to provide procurement of resources associated with the cloud computing network, wherein the temporal data defines at least a first date and time specifying when the message was received by the first computing service and a second date and time specifying when the at least some aspects of the message were forwarded to the second computing service;
   responsive to receiving the at least some aspects of the message having the predetermined message type at the second computing service, cause the second computing service to generate additional temporal data that defines at least a third date and time specifying when the at least some aspects of the message were received by the second computing service;
   communicate the temporal data and the additional temporal data to a telemetry store; and
   generate a report at the telemetry store that includes at least the temporal data and the additional temporal data, wherein the report indicates whether the first computing service and the second computing service are functioning properly.

2. The system according to claim 1, wherein the computer readable instructions further cause the system to:
   communicate the message to a lab service associated with the cloud computing network;
   receive the message at the lab service associated with the cloud computing network;
   generate additional data at the lab service in response to receiving the message, the additional data including test data;
   communicate the additional data to the telemetry store; and
   associate the additional data with the report.

3. The system according to claim 2, wherein the test data includes fuzzing test data generated by one or more virtual machines operating in the lab service.

4. The system according to claim 1, wherein the provisioning service provides scalable procurement of virtual machines in association with one or more applications that are being executed by the resources associated with the cloud computing network.

5. The system according to claim 1, wherein the resources associated with the cloud computing network that are procured by the provisioning service include at least one of physical machines or virtual machines.

6. The system according to claim 1, wherein the report that indicates whether the first computing service and the second computing service are functioning properly includes fuzz testing results.

7. The system according to claim 1, wherein the orchestrator service provides a rule driven workflow engine that operates between application programming interfaces and the interconnect platform of the cloud computing network.

8. A computer-readable storage medium having computer-executable instructions stored thereupon which, when executed by one or more processors of a computing system, cause the one or more processors of the computing system to:
   receive a message, which is generated based on user input received via a user interface (UI), at an orchestrator service that is deployed in association with a cloud computing network to manage connectivity with an interconnect platform of the cloud computing network;
   responsive to receiving the message at the orchestrator service and the message being a predetermined message type, generate temporal data and forward the message to a provisioning service that is deployed in association with the cloud computing network to provide procurement of resources associated with the cloud computing network, wherein the temporal data defines at least a first date and time specifying when the message was received by the orchestrator service and a second date and time specifying when the message was forwarded to the second computing service;
   responsive to receiving the message having the predetermined message type at the provisioning service, cause the provisioning service to generate additional temporal data that defines at least a third date and time specifying when the message was received by the second computing service;
   communicate the temporal data and the additional temporal data to a telemetry store; and
   generate a report at the telemetry store that includes at least the temporal data and the additional temporal data, wherein the report indicates whether the orchestrator service and the provisioning service are functioning properly.

9. The computer-readable storage medium according to claim 8, wherein the at least one processor is further caused to:
   communicate the message to another computing service associated with the cloud computing network;

receive the message at the other computing service associated with the cloud computing network;
generate additional data at the other computing service in response to receiving the message, the additional data including second additional temporal data that defines at least another date and time specifying when the message was received at the other computing service;
communicate the second additional temporal data to the telemetry store; and
associate the second additional temporal data with the report.

10. The computer-readable storage medium according to claim 8, wherein the at least one processor is further caused to:
communicate the message to a lab service associated with the cloud computing network;
receive the message at the lab service associated with the cloud computing network;
generate additional data at the lab service in response to receiving the message, the generated additional data including test data;
communicate the additional data to the telemetry store; and
associate the additional data with the report.

11. The computer-readable storage medium according to claim 10, wherein the test data includes fuzzing test data generated by one or more virtual machines operating in the lab service.

12. The computer-readable storage medium according to claim 8, wherein the provisioning service provides scalable procurement of virtual machines in association with one or more applications that are being executed by the resources associated with the cloud computing network.

13. The computer-readable storage medium according to claim 8, wherein the resources associated with the cloud computing network that are procured by the provisioning service include at least one of physical machines or virtual machines.

14. The computer-readable storage medium according to claim 8, wherein the report that indicates whether the orchestrator service and the provisioning service are functioning properly includes fuzz testing results.

15. A computer implemented method for inspecting elements of a cloud computing network, the method comprising:
receiving a message at a first computing service associated with the cloud computing network, the first computing service being an orchestrator service deployed in the cloud computing network to manage connectivity with an interconnect platform of the cloud computing network;
responsive to the message being a predetermined message type:
forwarding, by the first computing service, the message to a second computing service, wherein the second computing service is a provisioning service to provide procurement of resources associated with the cloud computing network;
generating, by the first computing service, temporal data indicating a first date and time specifying when the message was received at the first computing service and a second time and date specifying when the message was forwarded to the second computing service;
responsive to receiving the message at the second computing service, cause the second computing service to generate additional temporal data that defines at least a third date and time specifying when the message was received by the second computing service;
communicating the temporal data and the additional temporal data to a telemetry store; and
generating a report at the telemetry store that includes at least the temporal data and the additional temporal data, wherein the report indicates whether the first computing service and the second computing service are functioning properly.

16. The computer implemented method according to claim 15, further comprising:
communicating the message to a lab service associated with the cloud computing network,
receiving the message at the lab service associated with the cloud computing network;
generating additional data at the lab service in response to receiving the message, the generated additional data including test data; and
communicating the generated additional data to the telemetry store.

17. The computer implemented method according to claim 16, wherein the test data includes fuzzing test data generated by one or more virtual machines operating in the lab service.

18. The computer implemented method according to claim 15, wherein the provisioning service provides scalable procurement of virtual machines in association with one or more applications that are being executed by the resources associated with the cloud computing network.

19. The computer implemented method according to claim 15, wherein the resources associated with the cloud computing network that are procured by the provisioning service include at least one of physical machines or virtual machines.

20. The computer implemented method according to claim 15, wherein the report that indicates whether the first computing service and the second computing service are functioning properly includes fuzz testing results.

* * * * *